(12) United States Patent
Chaves et al.

(10) Patent No.: US 8,542,103 B2
(45) Date of Patent: Sep. 24, 2013

(54) RADIO FREQUENCY IDENTIFICATION READING BY USING ERROR CORRECTING CODES ON SETS OF TAGS

(75) Inventors: Leonardo Weiss Ferreira Chaves, Karlsruhe (DE); Mathis Schwuchow, Karlsruhe (DE); Andreas Schmidt, Karlsruhe (DE); Abraham Taherivand, Karlsruhe (DE)

(73) Assignee: SAP AG, Walldorf (DE)

( * ) Notice: Subject to any disclaimer, the term of this patent is extended or adjusted under 35 U.S.C. 154(b) by 753 days.

(21) Appl. No.: 12/195,488

(22) Filed: Aug. 21, 2008

(65) Prior Publication Data

US 2010/0045444 A1   Feb. 25, 2010

(51) Int. Cl.
- H04Q 5/22 (2006.01)
- H04K 1/00 (2006.01)
- H04L 9/00 (2006.01)
- H04L 9/28 (2006.01)

(52) U.S. Cl.
USPC ... 340/10.4; 340/10.41; 340/10.1; 340/10.31; 380/255; 380/277; 380/28

(58) Field of Classification Search
USPC .......................... 340/10.4; 380/255, 277, 28
See application file for complete search history.

(56) References Cited

U.S. PATENT DOCUMENTS

| | | | |
|---|---|---|---|
| 5,596,317 A * | 1/1997 | Brinkmeyer et al. | 340/5.26 |
| 6,496,806 B1 * | 12/2002 | Horwitz et al. | 705/28 |
| 6,707,376 B1 * | 3/2004 | Patterson et al. | 340/10.3 |
| 6,762,674 B2 * | 7/2004 | Matsushita | 340/5.91 |
| 7,501,948 B2 * | 3/2009 | Roemerman et al. | 340/572.1 |
| 7,588,185 B2 * | 9/2009 | Berquist et al. | 235/385 |
| 7,602,288 B2 * | 10/2009 | Broussard | 340/572.1 |
| 7,656,273 B2 * | 2/2010 | Ehrman et al. | 340/10.1 |
| 8,028,910 B2 * | 10/2011 | Seo et al. | 235/439 |
| 8,031,875 B1 * | 10/2011 | Juels et al. | 380/277 |
| 2004/0090310 A1 * | 5/2004 | Hohberger et al. | 340/10.1 |
| 2005/0099292 A1 * | 5/2005 | Sajkowsky | 340/539.13 |
| 2005/0237159 A1 * | 10/2005 | Cooper et al. | 340/10.5 |
| 2006/0255951 A1 * | 11/2006 | Roeder et al. | 340/572.7 |
| 2007/0001006 A1 * | 1/2007 | Schuessler et al. | 235/451 |
| 2007/0040682 A1 * | 2/2007 | Zhu et al. | 340/572.1 |
| 2007/0206786 A1 * | 9/2007 | Chakraborty | 380/30 |
| 2008/0018431 A1 * | 1/2008 | Turner et al. | 340/10.2 |
| 2008/0160984 A1 * | 7/2008 | Benes et al. | 455/419 |
| 2008/0181398 A1 * | 7/2008 | Pappu | 380/44 |
| 2008/0231426 A1 * | 9/2008 | Kamel | 340/10.4 |
| 2010/0172502 A1 * | 7/2010 | Jones et al. | 380/277 |

* cited by examiner

*Primary Examiner* — Daniel Wu
*Assistant Examiner* — Emily C Terrell

(57) ABSTRACT

A method and a system are described for improved reading of Radio Frequency Identification (RFID) tags using correcting codes on sets of electronic tags. A reading device requests information from each of a set of electronic tags. The information includes an identification code and a portion of a codeword, the codeword contains a coded message with identification codes of all tags in the set. The information is received from a subset of the set of tags. Portions of the codeword from the received tag information of the subset of tags are assembled. A decoding component to decode the assembled portions and to construct the coded message from the assembled portions of the codeword. Information is individually received from a remaining set of the tags in the set of tags. An enterprise system processes the received information from all tags in the set.

13 Claims, 6 Drawing Sheets

RADIO FREQUENCY IDENTIFICATION READING BY USING ERROR CORRECTING CODES ON SETS OF TAGS

FIELD OF INVENTION

Embodiments of the invention relate generally to the software arts, and, more specifically, to improved reading of Radio Frequency Identification (RFID) tag sets using correcting codes.

BACKGROUND

Radio Frequency Identification (RFID) is a technology that incorporates the use of electromagnetic or electrostatic coupling in the radio frequency portion of the electromagnetic spectrum to uniquely identify an object, animal, or person. RFID is used as an alternative to the bar code technology. An RFID system consists of three components: an antenna, a transceiver, and a transponder (the tag). The antenna and transceiver are often combined into a single reader. The antenna uses radio frequency waves to transmit a signal that activates the transponder. When activated, the RFID tag transmits data back to the antenna. The data is used to notify a programmable logic controller that an action should occur. The action could be as simple as raising an access gate or as complicated as interfacing with a database to carry out a monetary transaction. Some tags can be read from several meters away and beyond the line of sight of the reader.

RFID tags come in three general varieties: passive, active, or semi-passive. Passive tags require no internal power source, thus being pure passive devices (they are only active when a reader is nearby to power them), whereas semi-passive and active tags require a power source, usually a small battery. Depending on the attachment with identified objects, the tags can be attachable, implantable, and inserted.

RFID technology is widely used in many application fields. One important area is Supply Chain Management (SCM) where RFID tags are used to identify and track goods and raw materials along the supply chain. For the efficient organization of the supply chain, identification technologies whose acquisition rate lies close to 100% are needed. Otherwise, the danger exists that systems collect incomplete or faulty data. Although the read range and reading speed of RFID readers have improved in recent years, their reliability is still a problem. The accuracy of bulk capturing (e.g., the reading of a palette of RFID-tagged products) is not satisfying. Poor reading rates of 30% to 90% are common in these applications.

Standard approaches to improve the reliability of RFID systems try to optimize the technologies and protocols used. Many factors, like the frequencies used and the design of the antennas on the tags, influence the performance of the systems and must be optimally adjusted. To avoid interferences and perturbations from simultaneously transmitting RFID tags, multiplexing techniques are used. This can include time multiplexing methods (e.g., time division multiplexing) as well as frequency multiplexing. The latter requires the use of more expensive multi-frequency readers.

Error correcting codes and the Reed Solomon (RS) code are widely used in a variety of error correcting applications. CDs and DVDs use an interleaved RS code to correct errors caused by scratches on the surface. Many data transmission technologies, such as DSL, ATM, and WiMAX, as well as digital broadcast protocols such as Digital Video Broadcasting (DVB) and Digital Audio Broadcasting (DAB), use variants of the RS code to forward error correction.

Several advanced 2D-barcodes that can store more information than the typical linear ones use RS-codes as well. It is applied to single barcodes to make the reading fail-safe and to correct errors caused by damaged or unclear barcodes.

The commonly used RFID standards use error detecting codes such as Cycling Redundancy Checks (CRC). CRC-checksums are calculated over the data stored on a single chip and allow detecting errors caused by a faulty data transmission.

Another example of error correcting codes is the BCH codes. The BCH codes are characterized with the ease with which they can be decoded via an algebraic method known as syndrome decoding. This allows very simple electronic hardware to perform the decoding. The device itself can be small and low-powered. The BCH code is a multilevel, cyclic, error-correcting, digital code used to correct multiple random error patterns.

Hamming code is a linear error-correcting code that can detect and correct single-bit errors. Because of the simplicity of Hamming codes, they are widely used in computer memory (RAM). If more error-correcting bits are included with a message, and if those bits can be arranged such that different incorrect bits produce different error results, then bad bits could be identified. In a 7-bit message, there are seven possible single bit errors, so three error control bits could potentially specify not only that an error occurred but also which bit caused the error.

It should be appreciated that there are many error-correcting codes and the RS codes, BCH codes, and Hamming codes are provided only as examples of such codes.

FIGURES

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

SUMMARY

A method and a system are described for improved reading of Radio Frequency Identification (RFID) tags using correcting codes on sets of electronic tags. In one embodiment, information is requested from each of a set of electronic tags. The information includes an identification code and a portion of a codeword, the codeword contains a coded message with identification codes of all tags in the set. The information is received from a subset of the set of tags. Portions of the codeword from the received tag information of the subset of tags are assembled. The coded message is constructed from the assembled portions of the codeword. Finally, individually receiving information from a remaining set of the tags in the set of tags.

In one embodiment, the system includes a set of electronic tags and a reading device to request and receive information from each of the set of electronic tags. The information includes an identification code and a portion of a codeword, the codeword contains a coded message with identification codes of all tags in the set. In addition, the system includes a decoding component to decode a number of assembled portions of the codeword and construct the coded message with the identification codes of all tags in the set. An enterprise system processes the received information from all tags in the set.

DETAILED DESCRIPTION

Embodiments of the invention relate to a system and method for the improved reading of Radio Frequency Identification (RFID) tags by using error correcting codes on sets of the RFID tags, the method and system operate above the signal and protocol level. The method works independently from other methods that improve the reading performance of RFID systems on lower layers and can be combined with them. The method and system also relate to restoring information from tags that are damaged and completely unreadable.

In one embodiment of the invention, an error correction code (ECC) is applied to data stored in a set of RFID tags, rather than on a single tag. The ECC is used to correct faulty data transmission of a single tag. If the quality of the received transmission is too low or a tag is completely shielded from the reader, the data on the tag is lost. With the application of an ECC to a set of RFID tags, the data of unreadable tags can be restored.

In one embodiment, a supply chain system supported by RFID technology is a typical scenario where sets or groups of RFID tags are read at different stations. In the supply chain, the goods received and the goods output are verified constantly. At palette and packaging level, large groups of goods tagged with RFID transponders must be read. Due to influences of the environment, packing material or contents of the shipment, a reading rate of 100% is not achieved in most cases.

Figure 1:
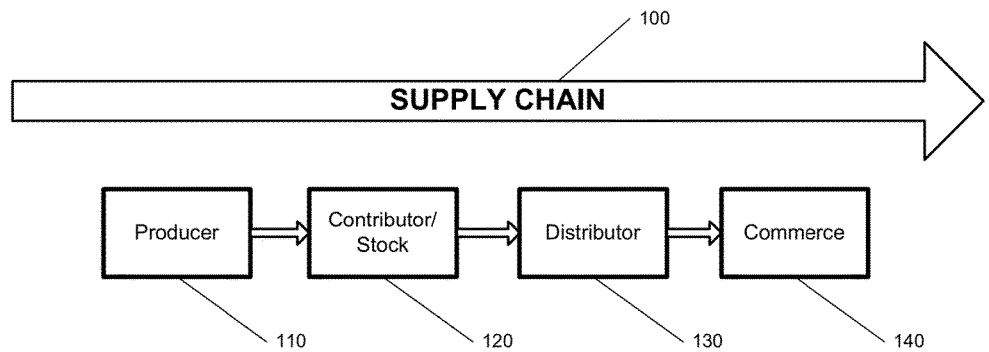
FIG. 1 is a block diagram of an embodiment of a supply chain system.

FIG. 1 is a block diagram of an embodiment of a supply chain system. Supply chain 100 is a simplified representation of a supply chain that includes several areas or departments. Supply chain 100 begins with Producer 110 representing the manufacturing process of a product. The supply chain 100 continues with Contributor/Stock 120 representing contribution of the product to a wholesale dealer or stocking the product by the manufacturer. The product is then handled by Distributor 130 that is responsible for distributing the product to retailers. The supply chain 100 ends with Commerce 140. The commerce 140 area provides the product to its final consumers.

The use of RFID technology at these areas offers several advantages: (1) information about the location of the product is available at all times (no "out-of-stock"); (2) faster examination of the contents of containers, palettes, etc.; (3) protection against modification during transportation; (4) theft control; (5) storage and stock management; and (6) higher data reliability (e.g., in enterprise resource planning, supply chain management, or customer relationship management systems).

Figure 2:
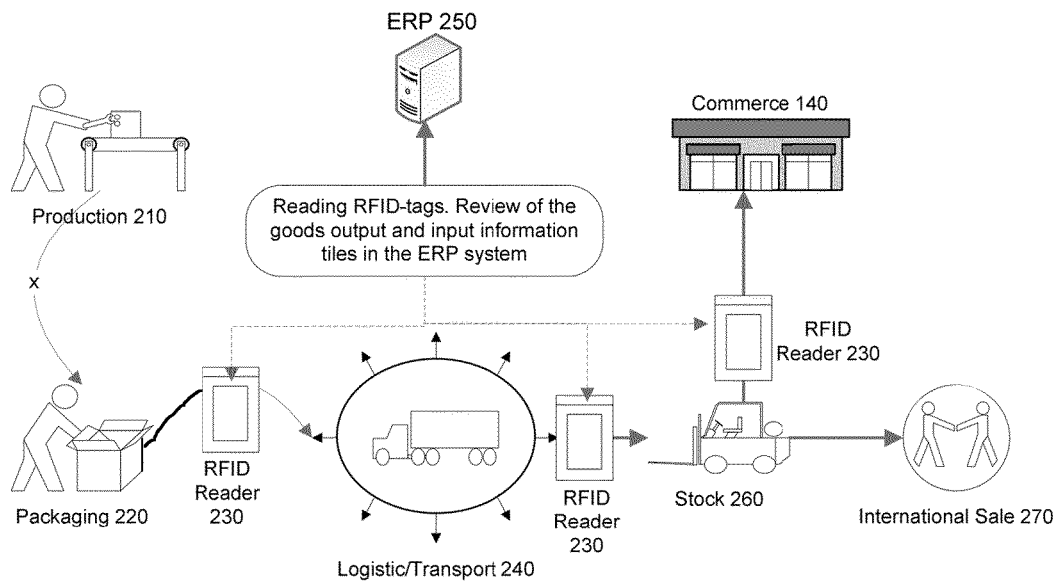
FIG. 2 is a block diagram of an embodiment of a supply chain system in the retail industry.

FIG. 2 is a block diagram of an embodiment of a supply chain system in the retail industry supported by RFID technology. Supply chain 100 begins with Production 210. At this phase, the products or goods are manufactured. The products receive an RFID label with a unique serial number for a quick identification along the entire supply chain 100. This unique serial number is known as electronic product code (EPC) in the retail industry. After the products are manufactured, they are transferred to Packing 220 for packing in pallets and containers. Although Packing 220 is a separate unit in the supply chain 100, it is part of the manufacturing process of the goods. As soon as the goods leave the manufacturing place, such as a factory, RFID readers 230 read the labels on the pallets and containers. This automatically provides an overview about all goods in a shipment.

The supply chain 100 continues with Logistic/Transport 240, where the labels are read again. The delivery is confirmed and the data about the contents of the shipment is transferred to ERP system 250. It is also possible to review the output and return of goods if the shipment is not complete. This step may include inventory audit, loss control, and so on. At Stock 260, the labels are read again. Review of the output and return of goods is also performed. Information is then sent to the ERP system 250. The supply chain 100 ends with either International Sale 270 or Commerce 140. RFID technology helps to optimize all processes within and outside the supply chain system.

As described above, the RFID technology can increase efficiency along the supply chain. Reliable systems and RFID readers with high reading rates are essential for optimal results. However, when large sets of tags are read, systems in an RFID supported supply chain suffer from two main problems: (1) poor RFID reading rates for bulk reads (typically only 30%-90%); and (2) erroneous and missing information caused by tags that are not read. As a result, errors in RFID-based business processes (e.g., goods receipt, inventory, etc.) generate additional costs (e.g., loss of time in the supply chain, inventory through multiple review, etc.). Therefore, a new solution is needed that improves the RFID reading rates for sets of RFID tags, reconstructs lost information caused by unread tags, corrects errors due to missing tag information, and extracts maximum information from the RFID tags.

The reading performance of RFID tags can be improved by storing information from set members in a set of RFID tags redundantly on all tags in the set. This improves the reading process in two ways. First, even if some of the tags cannot be read, the data stored on them is not lost as it can be retained from the redundant data. The data includes the tags unique identification numbers, such as the EPCs, and allows identifying all tags that belong to the group. Additional information, if available, can be retained as well. Second, as the unique identification numbers of the missing tags can be retained, these tags can be queried separately. Thus, the failure rate of the reading process is reduced. The amount of redundancy needed for reconstructing the missing data can be reduced by using error correcting codes.

An error correcting code is a code in which each data signal conforms to a specific set of rules of construction so that departures from this construction in the received signal can be automatically detected and corrected. The basic idea is for a transmitter to apply one or more error correcting codes; then a receiver uses these codes to narrow down exactly where in the message the error (if any) occurred.

Figure 3A:
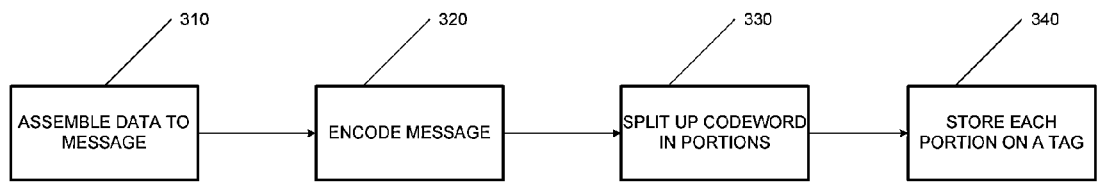
FIG. 3A is flow diagrams of an embodiment for generating and distributing a codeword for sets of electronic tags.
Figure 3B:
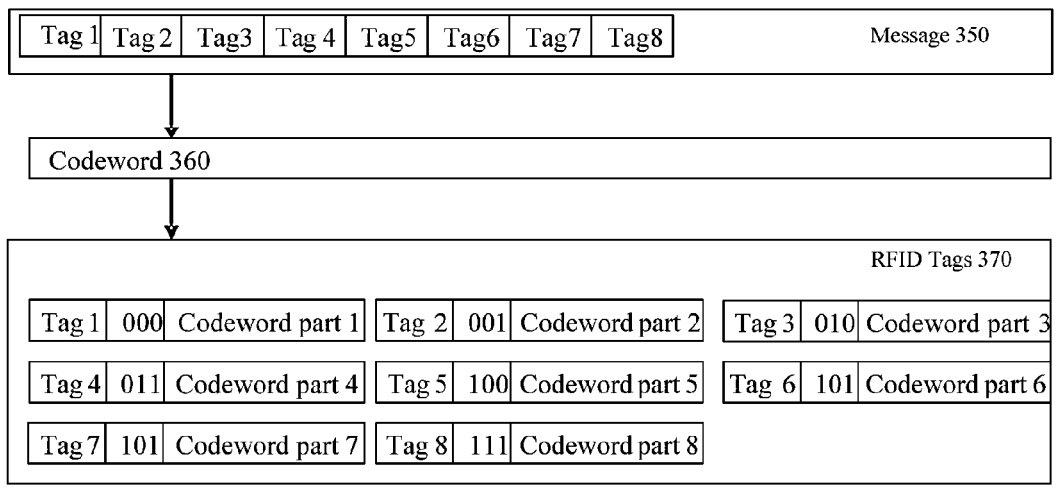
FIG. 3B is block diagrams of an embodiment that illustrates the generation and distribution of a codeword for sets of electronic tags.

FIG. 3A and FIG. 3B are flow diagrams of an embodiment for generating and distributing a codeword on sets of electronic tags. At block 310, data from a set of RFID tags is assembled to a message 350. In one embodiment, the data includes a unique serial number in the form of an electronic product code (EPC). At block 320, the message 350 is encoded using an error correcting code (ECC). A codeword 360 is generated. At block 330, the codeword 360 is split up into a number of portions. Each portion of the codeword 360 is stored on each tag in the group of RFID tags 370 at block 340. The codeword is stored with an address, as the address is used to ensure that the plurality of portions of the codeword is assembled in a specific order.

As the codeword contains redundant information, the original message can be reconstructed even if a certain subset of the tags cannot be read. In that way, all tags in the group can be identified.

Figure 4:
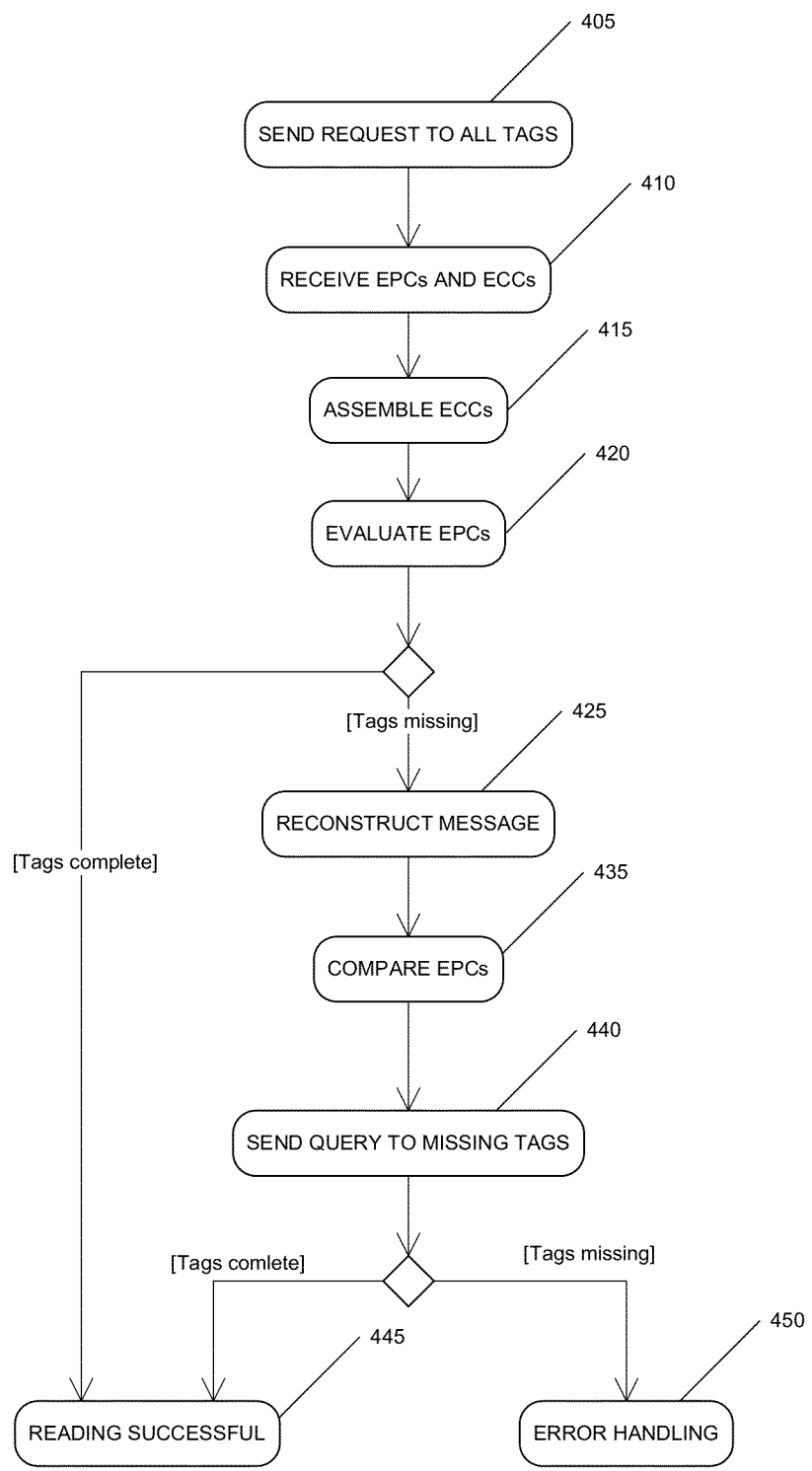
FIG. 4 is a flow diagram of an embodiment for reading a set of electronic tags.

FIG. 4 is a flow diagram of an embodiment for reading a set of electronic tags. In one embodiment, these tags can be RFID tags. At block 405, a request is sent to a set of RFID tags to obtain tag information including an identification code, such as an electronic product code (EPC), and a portion of codeword 360 from each tag in the set. The codeword 360 contains a coded message 350 with identification codes of all RFID tags in the set. The coded message 350 is encoded with an error correcting code (ECC) to generate codeword 360. The requested information is received at block 410. Due to signal interferences or environmental perturbations, the information of some tags in the set might be missing and only information from a subset of the electronic tags to be received. Thus, only a subset of the electronic tags is received.

At block 415, the received portions of the codeword of the subset of the electronic tags are assembled. At block 420, the received identification codes are evaluated. If there are missing tags and not all of the identification codes are received, the process continues at block 425. If all of the identification codes are received, the process continues at block 445. At block 445, all tags are read successfully.

At block 425, coded message 350 is constructed using the assembled portions of the codeword 360. The coded message 350 is constructed to receive the identification codes of all tags in the set. At block 435, the received identification codes from the subset of electronic tags and the received identification codes of all tags in the set are compared. If there are missing tags, at block 440, individual queries are sent to each tag of a remaining set of the set of electronic tags. At block 450, error handling is performed if tag information from a subset of the remaining set is not received. The procedures for error handling are domain specific (e.g., manual control). It is also possible to trust in the reconstructed message and to process data as if no reading errors occurred.

Figure 5:
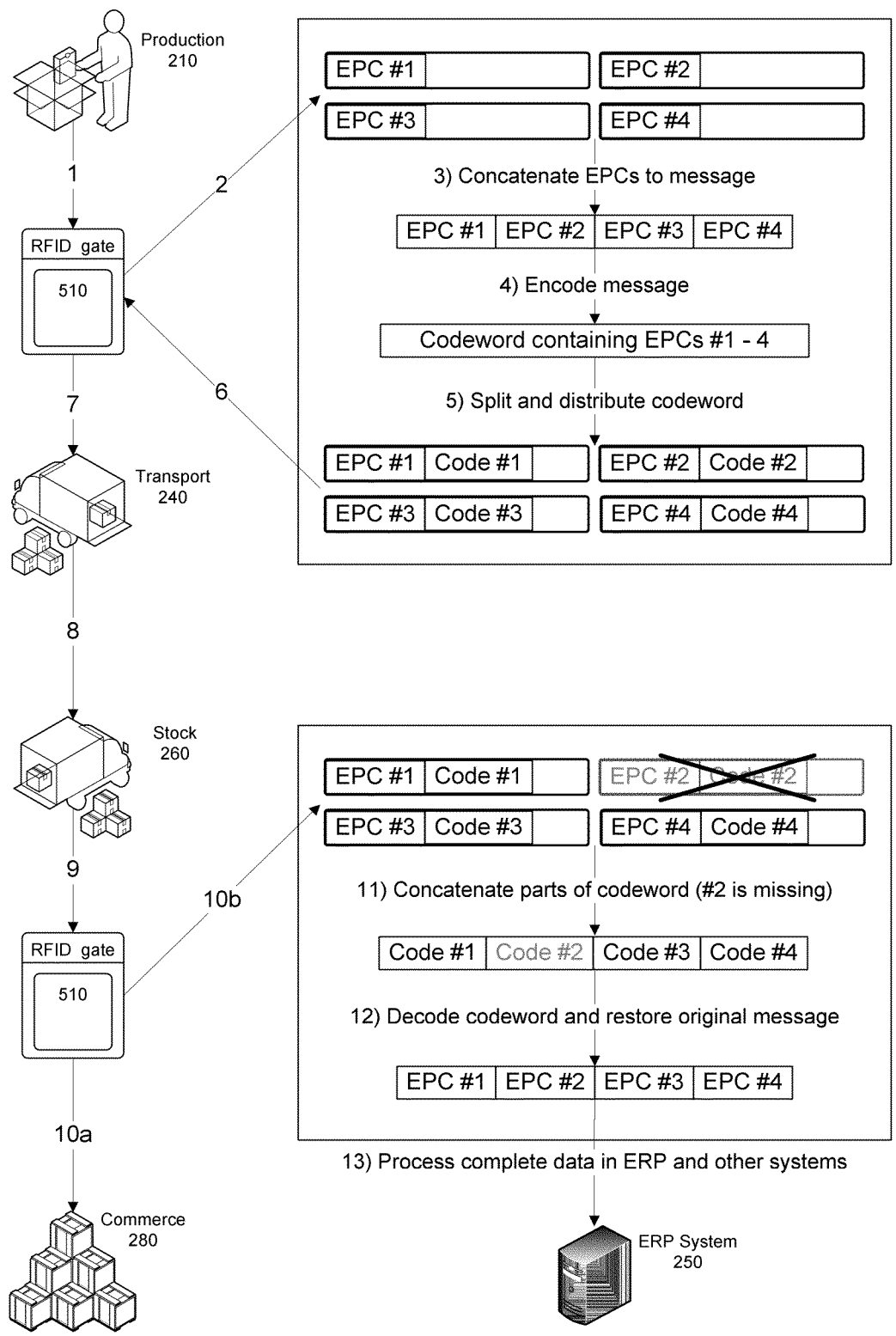
FIG. 5 is a block diagram of an embodiment that shows an example of a complete process for creating and reading a set of electronic tags.

FIG. 5 is a block diagram of an embodiment that shows an example of a process for creating and reading a set of electronic tags. This example is illustrated in relation to FIG. 2. The process begins with production area 210. After a product leaves the production area 210, it is sent to RFID Gate 510. At RFID Gate 510, the product is tagged with an RFID tag and then packed on palettes. Steps 2-6 show the process of creating and distributing a codeword. Before a palette leaves the distribution center, a codeword containing the identification codes, such as EPCs, from all products (or goods) on the palette is created and written on the RFID tags as described above.

The goods are sent to Transport 240 and Stock 260 in the supply chain. When the goods are received at Stock 260, the receiver (e.g., the wholesaler or retailer) monitors the delivery using an RFID system. If all of the tags are read by the RFID system, the process ends at Commerce 280 area. However, in most cases, not all RFID tags are read. If this is the case, the process continues with step 10b. To reconstruct the missing data, all available parts of the codeword are assembled. If the remaining part of the codeword is sufficient, it can be decoded via a decoding device and the missing data is retained (steps 11-12). If the data is complete, it is processed in an ERP 250 and other systems. If data is incomplete, individual queries are sent to specifically read out the missing RFID tags.

The amount of redundant information stored on each tag and the percentage of missing tags that can be reconstructed depend on the ECC used. More redundancy enables the reduction of failure rates. This trade-off can be illustrated with an example using the Reed Solomon (RS) code for error correction.

The RS code is chosen because it is widely used and very flexible. In general, it encodes messages with n symbols as a codeword with k symbols and can correct up to k−n erased symbols if their position in the codeword is known (or (k−n)/2 errors otherwise). The code operates on an alphabet with q symbols and n<q must hold. Hence, large messages require a large alphabet, leading to higher computational costs for encoding and decoding.

Figure 6:
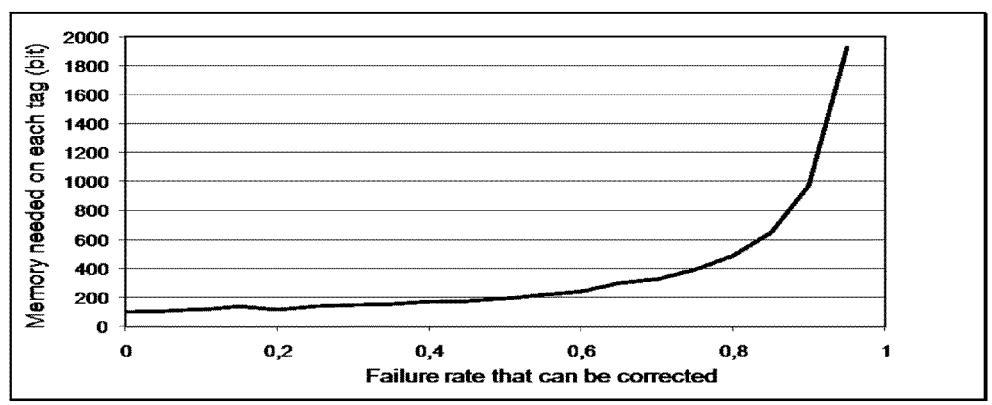
FIG. 6 is a block diagram of an embodiment that illustrates the length of a codeword portion stored on a tag that is required to correct a certain failure rate.

FIG. 6 is a block diagram of an embodiment that illustrates the length of a codeword portion stored on a tag that is required to correct a certain failure rate. The RS code is applied to a message of concatenated RFID tags with 96 bit EPC data. The length of the portions is independent of the set size, but large set sizes lead to longer messages and hence to higher computational costs for encoding and decoding.

Figure 7:
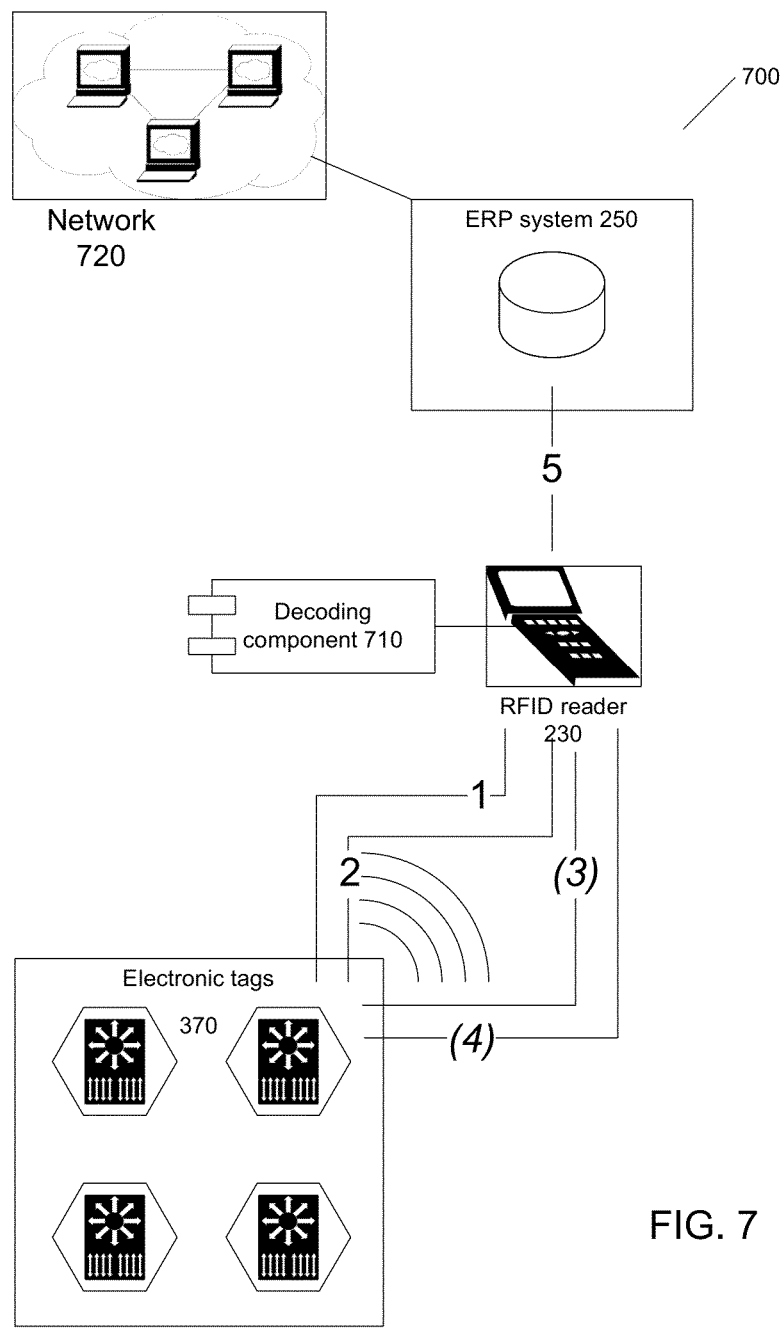
FIG. 7 is a block diagram of an embodiment of a system for reading electronic tags.

FIG. 7 is a block diagram of an embodiment of a system for reading electronic tags. System 700 includes a set of electronic tags 370. In one embodiment, the tags are Radio Frequency Identification (RFID) tags. The set of electronic tags 370 are read by a reading device RFID Reader 230. The reading device 230 requests and receives information from each of the set of electronic tags. The information receives includes an identification code and a portion of a codeword. The codeword contains a coded message with the identification codes of all tags in the set. System 700 also includes a decoding component 710. The decoding component 710 decodes a plurality of assembled portions of the codeword and constructs the coded message with the identification codes of all tags in the set. The decoding component 710 can run on the reading device 230 or on an ERP or other system 250. If some tags are missing, they can be read individually (steps 3 and 4). This can be skipped when a higher reliability in the received data is not needed. In this case, the reconstructed data is directly sent to the ERP system 250 where it is processed or transferred to network 720 (step 5). As the decoding of the assembled portions of the codeword is computationally expensive for large sets of tags, the use of a backend system, such as the ERP system 250, with more processing power is often preferable.

Elements of embodiments may also be provided as a machine-readable medium for tangibly storing the machine-executable instructions. The machine-readable medium may include, but is not limited to, flash memory, optical disks, CD-ROMs, DVD ROMs, RAMs, EPROMs, EEPROMs, magnetic or optical cards, or other type of manufactured machine-readable media articles suitable for storing electronic instructions. For example, embodiments of the invention may be downloaded as a computer program, which may be transferred from a remote computer (e.g., a server) to a requesting computer (e.g., a client) via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A computer-implemented method to enhance reading of information stored on electronic tags, the method comprising:

sending a first request to read, from a plurality of electronic tags, a plurality of identifiers associated with the plurality of electronic tags, and a plurality of portions of a message encoded by applying an error correcting code (ECC), wherein the message contains the plurality of identifiers;

receiving a subset of successfully read identifiers from the plurality of identifiers and a subset of successfully read portions from the plurality of portions of the encoded message, wherein the subset of identifiers and the subset of portions are associated with a subset of successfully responded to the request electronic tags from the plurality of electronic tags;

reconstructing the message by applying the ECC on the received subset of the plurality of portions of the encoded message;

based on the reconstructed message, restoring the plurality of identifiers including an unsuccessfully read identifier associated with a tag of the plurality of electronic tags;

determining the unsuccessfully read identifier based on comparison of the subset of the successfully read identifiers with the restored plurality of identifiers; and sending a second request to read the unsuccessfully read identifier from the tag associated with the unsuccessfully read identifier, wherein the second request includes a separate individual query to the tag that is based on the restored unsuccessfully read identifier.

2. The method of claim 1, further comprising:

splitting the encoded message into the plurality of portions, and storing at least one portion of the plurality of portions of the encoded message within at least one tag of the plurality of electronic tags.

3. The method of claim 2, wherein the at least one portion of the plurality of portions of the encoded message is stored within the at least one tag of the plurality of electronic tags together with at least one address of the at least one portion, the at least one address is used to ensure assembling the plurality of portions of the encoded message in a specific order.

4. The method of claim 1, further comprising:

performing error handling upon failing to receive information requested from the tag associated with the unsuccessfully read identifier.

5. The method of claim 1, wherein one or more of the plurality of electronic tags are Radio Frequency Identification (RFID) tags.

6. A computing system to enhance reading of information stored on electronic tags, the system comprising:

a plurality of electronic tags each associated with a corresponding identifier from a plurality of identifiers;

a reading device to send a first request to read, from the plurality of electronic tags, the plurality of identifiers, and a plurality of portions of a message encoded by applying an error correcting code (ECC), wherein the message contains the plurality of identifiers;

the reading device to receive a subset of successfully read identifiers from the plurality of identifiers and a subset of successfully read portions from the plurality of portions of the encoded message, wherein the subset of identifiers and the subset of portions are associated with a subset of successfully responded to the request electronic tags from the plurality of electronic tags;

a decoding component to reconstruct the message by applying the ECC on the received subset of the plurality of portions of the encoded message;

based on the reconstructed message, restore the plurality of identifiers including an unsuccessfully read identifier associated with a tag of the plurality of electronic tags; and determine the unsuccessfully read identifier based on comparison of the subset of the successfully read identifiers with the restored plurality of identifiers; and the reading device to send a second request to read the unsuccessfully read identifier from the tag associated with the unsuccessfully read identifier, wherein the second request includes a separate individual query to the tag that is based on the restored unsuccessfully read identifier.

7. The system of claim 6, wherein the encoded message is split into the plurality of portions and at least one portion of the plurality of portions is stored within at least one tag of the plurality of electronic tags.

8. The system of claim 7, wherein the at least one portion of the plurality of portions of the encoded message is stored within the at least one tag of the plurality of electronic tags together with at least one address of the at least one portion, the at least one address is used to ensure the plurality of portions of the encoded message are assembled in a specific order.

9. A non-transitory machine-readable storage medium, having instructions therein that when executed by the machine, cause the machine to:

send a first request to read, from a plurality of electronic tags, a plurality of identifiers associated with the plurality of electronic tags, and a plurality of portions of a message encoded by applying an error correcting code (ECC), wherein the message contains the plurality of identifiers;

receive a subset of successfully read identifiers from the plurality of identifiers and a subset of successfully read portions from the plurality of portions of the encoded message, wherein the subset of identifiers and the subset of portions are associated with a subset of successfully responded to the request electronic tags from the plurality of electronic tags;

reconstruct the message by applying the ECC on the received subset of the plurality of portions of the encoded message;

based on the reconstructed message, restore the plurality of identifiers including an unsuccessfully read identifier associated with a tag of the plurality of electronic tags;

determine the unsuccessfully read identifier based on comparison of the subset of the successfully read identifiers with the restored plurality of identifiers; and send a second request to read the unsuccessfully read identifier from the tag associated with the unsuccessfully read identifier, wherein the second request includes a separate individual query to the tag that is based on the restored unsuccessfully read identifier.

10. The machine-readable storage medium of claim 9, having instructions that when executed further cause the machine to:

split the encoded message into the plurality of portions, and store at least one portion of the plurality of portions of the encoded message within at least one tag of the plurality of electronic tags.

11. The machine-readable storage medium of claim 10, wherein the at least one portion of the plurality of portions of the encoded message is stored within the at least one tag of the plurality of electronic tags together with at least one address of the at least one portion, the at least one address is used to ensure assembling the plurality of portions of the encoded message in a specific order.

12. The machine-readable storage medium of claim 9, having instructions that when executed further cause the machine to:

perform error handling upon failing to receive information requested from at least one tag of the plurality of tags.

13. The machine-readable storage medium of claim 9, wherein one or more of the plurality of electronic tags are Radio Frequency Identification (RFID) tags.

* * * * *